Patented Oct. 4, 1927.

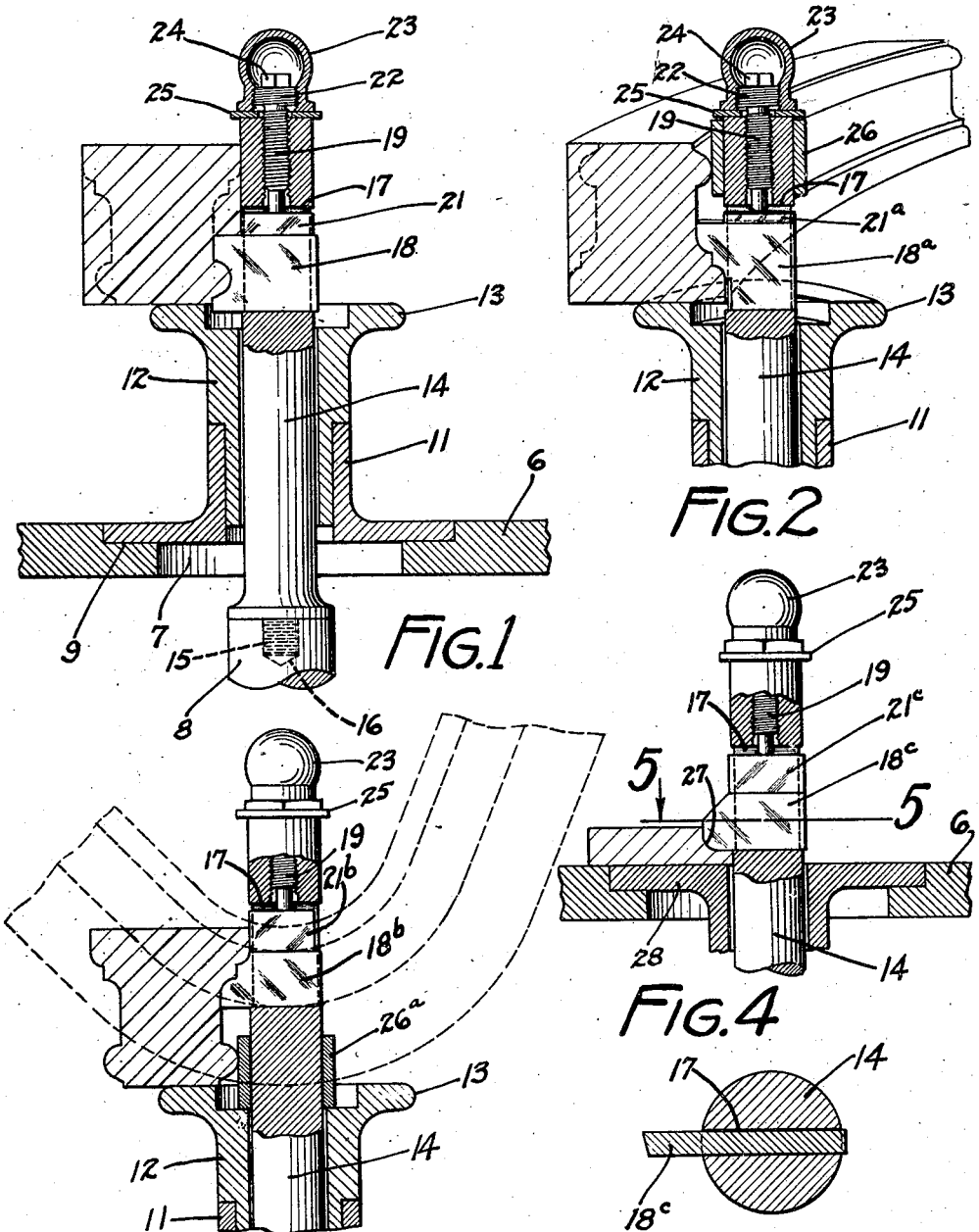

1,644,442

UNITED STATES PATENT OFFICE.

JOHN W. OSTMAN, OF MINNEAPOLIS, MINNESOTA.

TOOL SPINDLE FOR WOOD SHAPERS.

Application filed November 9, 1925. Serial No. 67,847.

This invention relates to improvements in wood working machines such as shapers, and more particularly relates to the tool spindles of such machines against which moldings, rails or other wood pieces are held for cutting and shaping.

An object of the invention is to provide a shaper spindle having the cutting knife radially mounted therein in such a manner that the diameter of the spindle may be relatively smaller as compared with spindles now in use, thereby adapting it for cutting comparatively small curves or bends in the work, such for instance, as the usual bends or crooks in stair case hand rails which are now usually carved by hand.

A further and more specific object of the invention is to provide a shaper spindle having a slot provided therein to receive the knife, thereby allowing the cutting edge of the knife to be located comparatively closer to the axis of the spindle with the result that the sweep or effective radius on which the cutting edge of the knife travels, will be comparatively small, thereby adapting the spindle for cutting small curves or bends and, at the same time, greatly simplifying the construction of the spindle.

Other objects of the invention will appear from the following description and the accompanying drawings and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification,

Figure 1 is a sectional view showing a portion of a shaper work table and the improved spindle mounted therein;

Figure 2 is a perspective view showing a curved rail positioned against the spindle;

Figure 3 is a similar view showing the improved manner of cutting the base or wider portion of the rail;

Figure 4 is a view showing how the spindle may be used for cutting a small groove or recess in the edge of a board; and Figure 5 is a cross sectional view of the spindle and knife taken on the line 5—5 of Figure 4.

In the selected embodiment of the invention here shown, for purposes of disclosure, there is illustrated the work table 6 of a wood shaper, having an opening or aperture 7 therein to receive the spindle 8 as shown. The upper face of the work table 6 is provided with a seat 9 adapted to receive a flanged collar 11 in which a work support or rest 12 is mounted as shown in Figure 1. This support is provided with an annular flange 13 adapted to support the work while held against the spindle as shown.

An important feature of this invention resides in the novel construction of the upper portion or tool-supporting end 14 of the spindle. This tool-supporting end 14 of the spindle is preferably independently formed and is demountably secured to the usual spindle 8 by such means as the threaded end portion 15 received in a threaded socket 16 in the spindle 8. Thus the upper end of the spindle will be securely connected to the spindle 8 for rotation therewith as a unit.

A knife-receiving slot 17 is provided adjacent the upper end of the spindle 14 adapted to receive the cutter or knife 18 securely held therein by means of a lock screw 19 received in a threaded socket in the upper end of the spindle. A filler block 21 is preferably interposed between the upper edge of the knife 18 and the terminal of the lock screw 19. Various sizes of filler blocks may be required depending upon the widths of the knife blades employed. In Figure 2 it will be noted that the knife blade $18^a$ is comparatively wider than the knife shown in Figure 1 and also that the filler block $21^a$ is therefore considerably smaller than the one shown in Figure 1. By thus varying the sizes of the filler blocks, the slot 17 and lock screw 19 may be made standard, the length of the slot being sufficient to receive the widest knife used.

The upper end of the lock screw 19 has a threaded head 22 adapted to receive a threaded cap 23 which functions to provide a closure for the squared end 24 of the lock screw to prevent the operator from injuring his hands, should he accidentally come in contact with the rapidly revolving squared end of the lock screw. A washer 25 is preferably interposed between the upper end of the spindle 14 and the cap 23.

In Figure 2 the use of a guide collar 26 is shown mounted upon the upper edge of the spindle 14 to guide the rail or work as it is held against the knife blade $18^a$. This guide collar 26 cooperates with the spindle to provide a guide for the work when one portion thereof is cut or shaped to a relatively narrower dimension than another portion, as for instance, in Figure 2 it will be noted that the bottom or base of the rail is comparatively wider than the upper portion thereof. The diameter of this guide collar, therefore, is dependent upon the amount of overhang of the lower portion of the rail.

In Figure 3, a guide collar 26ª is shown mounted upon the spindle below the knife blade 18ᵇ, and cooperates with the spindle to guide the rail or work in a manner similar to that shown in Figure 2. In this figure, however, the position of the rail upon the support 13 is reversed from that shown in Figure 2, so that the upper portion or base of the rail will be guided by being held against the spindle while the lower portion thereof will be guided by the collar 26ª. Thus, by the use of the guide collars 26 and 26ª in conjunction with the spindle 14 the rail or work may be accurately guided while being cut or shaped.

Figure 4 illustrates how the spindle may be used for cutting a recess 27 in one edge of a board. When thus used a plate 28 is preferably mounted in the seat 9 of the shaper work table. The upper surface of the plate 28 is substantially flush with the face of the work table so that the work may be moved over the surface of the table against the knife blade 18ᶜ.

By mounting the knife blade or cutter for cutting tools in the spindle as above described, and as shown in Figure 5, the spindle may be made comparatively small in diameter thereby adapting is for use for cutting small curves or bends such as are frequently used in the construction of stair hand-rails. It will also be seen that by radially mounting the knife in the spindle as shown, grooves may be cut in the sides of hand rails or other work when held in the position shown in dotted lines in Figure 3, and such grooves will be substantially accurate as a result of the sweep or radial travel of the cutting edge of the knife being comparatively close to the axis of the spindle.

The spindle 14 is also demountably secured to the usual spindle 8 of the shaper so that it may readily be removed therefrom, and a smaller or larger spindle substituted if desired. The spindle 8 of the shaper is operated by the usual driving mechanism (not shown), which mechanism also is provided with means for vertically adjusting the working position of the spindle to properly align the cutting tool with the work. The use of the work support 12 is neccessary only when cutting work having bends or curves therein. When the work is comparatively straight the plate 28 will be used instead of the work support 12 so that the work may be placed directly upon the surface of the shaper table 6 and held against the spindle as shown in Figure 4.

Having thus described my invention what I claim as new and desire to secure by Letters Patent is:

1. A tool spindle for wood shapers, having an opening therein adapted to receive a tool, a threaded socket in the spindle, a lock screw in said socket adapted to engage said tool, and lock it to said spindle, and means covering the upper end of said lock screw.

2. A demountable tool spindle for shapers, a transverse slot in the spindle adapted to receive a tool, a threaded lock screw terminally and axially mounted in said spindle adapted to lock said tool thereto, an enlarged threaded head on said lock screw, and a cap mounted on said head to provide a closure therefor.

3. A demountable tool spindle for shapers, a transverse slot in the spindle adapted to receive a cutting tool, a threaded lock screw terminally mounted in said spindle adapted to lock said tool thereto, a guide collar on the spindle, a guide collar retaining washer mounted on the spindle, an enlarged threaded head on the lock screw, and a cap mounted on said head and adapted to secure said washer to said spindle.

4. A device of the class described including a table having an opening and a recess at the top circumscribing the opening, a cutter spindle traversing the opening and extending above the table, a work-supporting sleeve about the spindle comprising a base section having a flange fitting the recess coplanar with the top surface of the table, and a work rest section having a working surface of small area, said rest section adapted to be removed, and said base section reversed in the recess, to provide a co-planar continuation of the table.

5. A device of the class described including a table having an opening and a recess at the top circumscribing the opening, a cutter spindle traversing the opening and extending above the table, a work-supporting sleeve about the spindle comprising a base section having a flange fitting the recess coplanar with the top surface of the table, and a work rest section having a working surface of small area, said rest section adapted to be removed, and said base section reversed in the recess, to provide a co-planar continuation of the table, said cutter spindle demountably secured to a drive spindle at a point below the table, to permit removal, and substitution of a spindle of different length, when the base section of the work-supporting sleeve is arranged as a co-planar continuation of the top surface of the table.

6. A device of the class described including a table having an opening and a recess at the top circumscribing the opening, a cutter-carrying spindle traversing the opening, a sleeve loosely surrounding the spindle above the table, said sleeve comprising separable sections, one section providing an elevated work rest surface of small area, and the other having a base flange fitting within the recess co-planar with the upper space of the table, whereby one section can be removed and the other reversed in the recess, to provide a co-planar continuation of the top surface of the table.

7. A device of the class described including a table having an opening and a recess at the top circumscribing the opening, a cutter spindle traversing the opening, a spool-shaped extension above the table surrounding the spindle as a work support comprising two telescopingly engaged sections, an upper section abuttingly resting upon a lower section and having a terminal flange of small area at its top, and a lower section having a terminal flange of greater area at its bottom, co-planar with the top surface of the table and within the recess.

8. In a device for guiding and cutting lumber to produce symmetrical molding having different cross measurements at opposite ends, and for forming such molding from straight lumber, or from curved stock of small radius, which comprises a table, a cutter spindle of small diameter projecting above the table and having a radial cutter tool, a work support encircling the spindle below the cutter, an anti-friction sleeve rotatable upon the spindle as a work guide and adapted to be placed above or below the cutter to be engaged by a finished narrower portion of the work to guide the cut for the wider portion, whereby the spindle acts as a guide while the cut is made at the narrower end and whereby the collar is engaged by the finished narrow portion either above or below the tool to guide the cut at the wider portion while the work rests upon the support.

9. In a device for guiding and cutting lumber to produce symmetrical molding having different cross measurements at opposite ends, and for forming such molding from straight lumber, or from curved stock of small radius, which comprises a table, a cutter spindle of small diameter projecting above the table and having a radial cutter tool, a work support encircling the spindle below the cutter, an anti-friction sleeve rotatable upon the spindle as a work guide and adapted to be placed above or below the cutter to be engaged by a finished narrower portion of the work to guide the cut for the wider portion, whereby the spindle acts as a guide while the cut is made at the narrower end and whereby the collar is engaged by the finished narrow portion either above or below the tool to guide the cut at the wider portion while the work rests upon the support, said support having a recess to receive and support the sleeve with its lower end below the working surface of the support, below the cutter, and said spindle having a plate removably secured at its upper end as a stop overhanging the sleeve, when said sleeve is above the cutter.

In witness whereof, I have hereunto set my hand this 7th day of November, 1925.

JOHN W. OSTMAN.